US010321337B2

(12) United States Patent
Lee et al.

(10) Patent No.: US 10,321,337 B2
(45) Date of Patent: Jun. 11, 2019

(54) ANTENNA CONTROL SYSTEM IN BASE STATION SYSTEM AND CONFIGURATION METHOD THEREFOR

(71) Applicant: KMW INC., Hwaseong-si (KR)

(72) Inventors: Dong-hun Lee, Hwaseong-si (KR);
Yong-hyo Jeon, Hwaseong-si (KR);
Minji Park, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 15/602,134

(22) Filed: May 23, 2017

(65) Prior Publication Data
US 2017/0265090 A1    Sep. 14, 2017

Related U.S. Application Data

(63) Continuation of application No. PCT/KR2015/011135, filed on Oct. 27, 2015.

(30) Foreign Application Priority Data

Nov. 25, 2014  (KR) .................. 10-2014-0165662

(51) Int. Cl.
*H04M 3/00*   (2006.01)
*H04W 24/02*  (2009.01)
(Continued)

(52) U.S. Cl.
CPC ............ *H04W 24/02* (2013.01); *H01Q 1/246* (2013.01); *H04L 29/04* (2013.01); *H04L 29/10* (2013.01);
(Continued)

(58) Field of Classification Search
CPC ..... H04W 24/02; H04W 8/245; H04W 16/28; H04W 80/04; H04W 88/02; H04M 1/72519; H04M 1/71515; H01Q 1/246
(Continued)

(56) References Cited

U.S. PATENT DOCUMENTS 6,822,943  B1     11/2004  Mantin
7,050,379  B2 *   5/2006   Takahashi ................ G02B 9/04
                                                369/112.08
(Continued)

FOREIGN PATENT DOCUMENTS

GB              2414137 A      11/2005
KR    10-2010-0122092 A1       11/2010
(Continued)

OTHER PUBLICATIONS

International Search Report for PCT/KR2015/011135, dated Feb. 24, 2016, and its English translation.
(Continued)

*Primary Examiner* — Danh C Le
(74) *Attorney, Agent, or Firm* — Insight Law Group, PLLC; Seung Lee

(57) ABSTRACT

An antenna control system in a base station system, and a configuration method of the antenna control system are disclosed. A method of controlling antennas in a multi-ALD (Antenna Line Device) system including ALDs and ports linked with multiple base stations is provided including receiving configuration command by one of ALDs from one of base stations, transferring configuration command by the ALD that received configuration command to each of remaining ALDs, and setting an antenna for controlling or port for linking by each ALD according to the configuration command. In accordance with some embodiments, a multi-ALD system for controlling a plurality of antennas includes ports for linking with multiple base stations, respectively, and ALDs for controlling the antennas, wherein the ALDs are linked for intercommunications with each other, to set an antenna to control or a port to link according to configuration command received from one of the base stations.

20 Claims, 10 Drawing Sheets

(51) Int. Cl.
*H04L 29/04* (2006.01)
*H04L 29/10* (2006.01)
*H01Q 1/24* (2006.01)
*H04L 12/24* (2006.01)
*H04W 88/08* (2009.01)

(52) U.S. Cl.
CPC ........ *H04L 41/084* (2013.01); *H04L 41/0823* (2013.01); *H04L 41/0873* (2013.01); *H04W 88/085* (2013.01)

(58) Field of Classification Search
USPC ............ 455/562.1, 418, 550.1, 509; 370/328
See application file for complete search history.

(56) References Cited

U.S. PATENT DOCUMENTS

| | | | |
|---|---|---|---|
| 8,026,863 B2* | 9/2011 | Young | H01Q 21/0025 342/373 |
| 8,804,560 B2* | 8/2014 | Zhao | H04B 7/082 370/252 |
| 9,319,904 B1* | 4/2016 | Srinivasa | H04W 24/02 |
| 9,621,247 B1* | 4/2017 | Park | H04B 7/0617 |
| 2002/0164963 A1* | 11/2002 | Tehrani | H04B 7/061 455/101 |
| 2005/0271044 A1 | 12/2005 | Hsu et al. | |
| 2008/0300022 A1 | 12/2008 | Dong et al. | |
| 2009/0122700 A1* | 5/2009 | Aboba | H04W 28/20 370/230 |
| 2010/0113097 A1* | 5/2010 | Seeor | H04W 88/085 455/562.1 |
| 2012/0038513 A1 | 2/2012 | Li et al. | |
| 2012/0062356 A1* | 3/2012 | Mann | H01Q 21/08 340/3.5 |
| 2012/0100814 A1* | 4/2012 | Soulhi | H04B 7/0491 455/67.14 |
| 2012/0134079 A1* | 5/2012 | Liao | B29C 45/14811 361/679.01 |
| 2012/0149411 A1* | 6/2012 | Miyoshi | H04B 7/0413 455/501 |
| 2012/0178483 A1* | 7/2012 | Rosenau | H04W 28/16 455/509 |
| 2014/0073340 A1* | 3/2014 | Nilsson | H04W 16/28 455/452.1 |
| 2014/0287696 A1 | 9/2014 | Moon et al. | |
| 2016/0352002 A1* | 12/2016 | Aue | H01Q 1/246 |

FOREIGN PATENT DOCUMENTS

| | | |
|---|---|---|
| KR | 10-2013-0070144 A1 | 6/2013 |
| KR | 10-2013-0087362 A1 | 8/2013 |
| WO | 2014042444 A1 | 3/2014 |

OTHER PUBLICATIONS

The Extended European Search Report dated Jun. 25, 2018 for European Application No. 15863702.5.

* cited by examiner

|  | ANT #1 | ANT #2 | ANT #3 | ANT #4 |
|---|---|---|---|---|
| ALD #1 | Connected | Connected | N/A | N/A |
| ALD #2 | N/A | N/A | Connected | N/A |
| ALD #3 | N/A | N/A | N/A | Connected |

※ N/A : No Access

*FIG. 4*

|  | ALD #1 | ALD #2 | ALD #3 | ALD #4 |
|---|---|---|---|---|
| PORT #1 | R/W | N/A | R/O | N/A |
| PORT #2 | N/A | R/W | R/W | N/A |
| PORT #3 | N/A | R/O | N/A | R/W |

※ N/A : No Access, R/W : Read/Write, R/O : Read Only

*FIG. 7*

ANTENNA CONTROL SYSTEM IN BASE STATION SYSTEM AND CONFIGURATION METHOD THEREFOR

CROSS-REFERENCE TO RELATED APPLICATIONS

The present application is a continuation of International Patent Application No. PCT/KR2015/011135, filed Oct. 27, 2015, which claims priority to Korean Patent Application No. 10-2014-0165662, filed on Nov. 25, 2014. The disclosures of the above-listed applications are hereby incorporated by reference herein in their entirety.

TECHNICAL FIELD

The present disclosure in some embodiments relates to an antenna control system in a base station system and a configuration method therefore. More particularly, the present disclosure relates to a method of configuring an antenna control system in which the operation of a corresponding antenna is remotely controlled according to an AISG (Antenna Interface Standards Group) protocol.

BACKGROUND

The statements in this section merely provide background information related to the present disclosure and do not necessarily constitute prior art.

An antenna system of a mobile communication base station that is currently widely used has a structure in which radiation elements vertically arranged for transmitting or receiving two polarized waves perpendicular to each other. It is necessary to adjust the tilt and azimuth or other factors of the antenna in order to align the polarization directions between the transmit and receive antennas or to improve transmission and reception performance.

In the past, to adjust the tilt and azimuth of an antenna, a mechanical method was mainly used involving a technician to climb up a tower and manually adjust the entire antenna. The mechanical method is not only dangerous, but also is disadvantageous with a difficulty to immediately tackle an emergency situation.

Recently, an electrical method has been employed in which a phase shifter is inserted into an antenna, and then the tilt and azimuth of the antenna are electrically adjusted. A method of electrically controlling an antenna is disclosed in Korean Patent Application Publication No. 10-2010-0122092.

The types of devices to control the antenna include: a remote electrical tilt unit (RET) to control the tilt of the antenna, a tower-mounted amplifier (TMA) to control the amplifier, a remote azimuth steering (RAS) unit to adjust the azimuth of the antenna, and an remote azimuth beamwidth (RAB) unit. There are various other antenna control devices such as an alignment sensor device (ASD), an antenna clock source (ACS), a geographic location sensor (GLS), a configurable power monitor (CPM), an antenna temperature sensor (ATS) and a remote antenna extension (RAE). As technology advances, new antenna control devices are being added. In this specification, the above-described antenna control devices are referred to as antenna line devices (hereinafter, "ALDs").

In the current mobile communication environment, in which 2G, 3G and 4G (4th Generation Long Term Evolution) systems have been commercialized and 5G is being prepared for introduction, various communication service frequency bands coexist according to communication systems or operators and countries. In order to facilitate integrated management of the base stations and to reduce the operational cost of the base stations, a plurality of base stations is consolidated in many cases.

A base station system may be composed of a plurality of base stations conforming to different communication standards and antennas of the bands used by the respective base stations. In the base station system, service coverages may overlap and it is necessary to coordinate the antennas to minimize signal interference in regions where coverages can overlap each other. Attempts have been made to apply antenna control techniques to minimize signal interference and maximize network capacity in a base station system.

Conventional techniques related to a base station system are disclosed in Korean Patent Application Publication No. 10-2013-0070144 and Korean Patent Application Publication No. 10-2013-0087362.

FIG. 1 is a diagram of a conventional base station system.

The base station system includes a plurality of base transceiver stations (BTSs) and antennas used in the respective BTSs. The respective BTSs 111, 112 and 113 are connected to the antennas 141, 142 and 143 used by the BTSs on a one-to-one basis.

Each of the base stations 111, 112 and 113 is connected to each ALD 131, 132 133 via ports 121, 122 and 123. The ALDs 131, 132 and 133 control a corresponding one of the antennas 141, 142 and 143.

In the conventional antenna control methods disclosed in Korean Patent Application Publication No. 10-2013-0070144 and Korean Patent Application Publication No. 10-2013-0087362, each BTS directly controls an antenna connected thereto on a one-to-one basis. However, as communication systems become more complex, it has become necessary to flexibly set the antennas to be controlled by each BTS.

DISCLOSURE

Technical Problem

Therefore, the present disclosure in some embodiments seeks to provide a system and method that improve the flexibility of antenna control according to the antenna interface standards group (AISG) standard and enable optimized configuration of an antenna control system according to changes in the communication environment by allowing the base station system to freely change interconnections between a plurality of ports and a plurality of ALDs or interconnections between a plurality of ALDs and antennas to be controlled by the respective ALDs.

SUMMARY

In accordance with some embodiments of the present disclosure, a method of controlling a plurality of antennas in a multi-ALD system including a plurality of ALDs and a plurality of ports linked with a plurality of base stations is provided including receiving a configuration command by an ALD of the a plurality of ALDs from a base station of the plurality of base stations, transferring the configuration command by the ALD in receipt of the configuration command to each of the remaining ALDs, and setting an antenna to be controlled or a port to be linked by each of the plurality of ALDs according to the configuration command.

In accordance with some embodiments of the present disclosure, a multi-ALD system for controlling a plurality of antennas includes a plurality of ports configured to be linked with a plurality of base stations, respectively, and a plurality of ALDs configured to control the plurality of antennas. Here, the plurality of ALDs are linked for intercommunications with each other, to set an antenna to control or a port to link according to a configuration command received from one of the plurality of base stations.

Advantageous Effects

According to the present disclosure as described above, a base station system can freely change the interconnections between a plurality of ports and a plurality of ALDs or the interconnections between a plurality of ALDs and antenna to be controlled by each ALD. Thereby, the flexibility of antenna control can be improved and the antenna control system can be optimized.

BRIEF DESCRIPTION OF THE DRAWINGS

FIG. 4 is an exemplary diagram of a configuration command according to the first embodiment.

FIG. 7 is an exemplary diagram of a configuration command according to the second embodiment.

DETAILED DESCRIPTION

Figure 1:
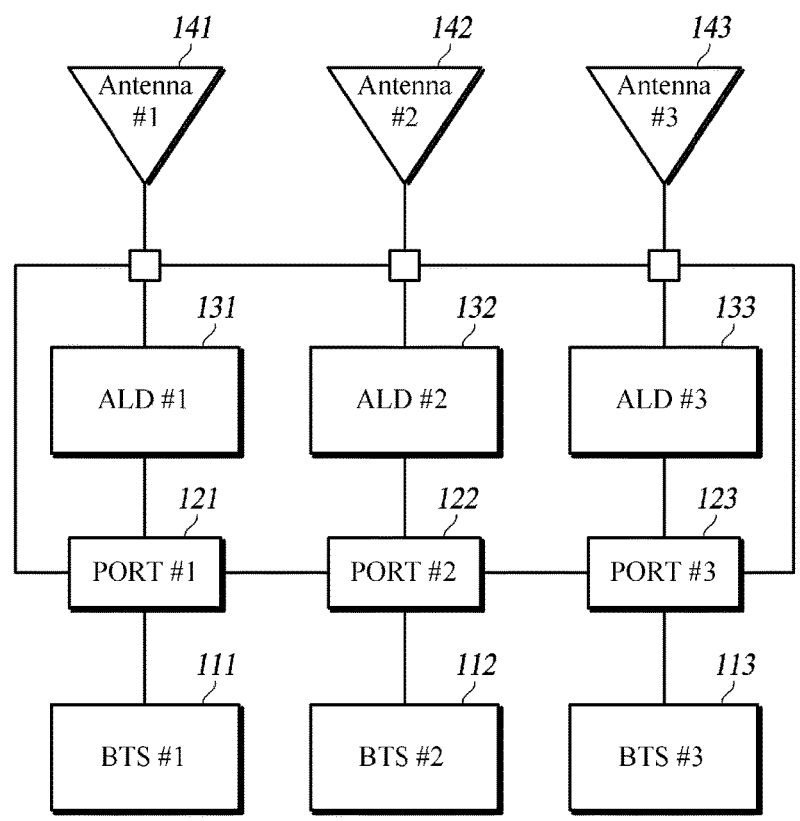
FIG. 1 is a diagram of a conventional base station system.

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but neither imply nor suggest the substances, the order or sequence of the components. Throughout this specification, when a part "includes" or "comprises" a component, the part may further include other components, such other components are not excluded unless there is a particular description contrary thereto. Terms such as "unit", "module", and the like refer to units for processing at least one function or operation, which may be implemented by hardware, software, or a combination thereof.

As antenna control methods become more complex, various additional functions are demanded. For example, in the past, the ALDs or the frequency bands controlled by respective base stations have been fixed, but recently it has become necessary to change the ALD or frequency band controlled by each base station.

In this specification, the antenna control system configured to flexibly change and control the ALDs or antennas to be controlled by the respective base stations in a base station system is referred to as a "multi-ALD system."

In the conventional base station system shown in FIG. 1, a base station and an antenna correspond to each other on a one-to-one basis, and each base station controls only the antenna of its own frequency band. In contrast, in the multi-ALD system according to at least one embodiment, each base station can control an antenna of another frequency band.

Figure 2:
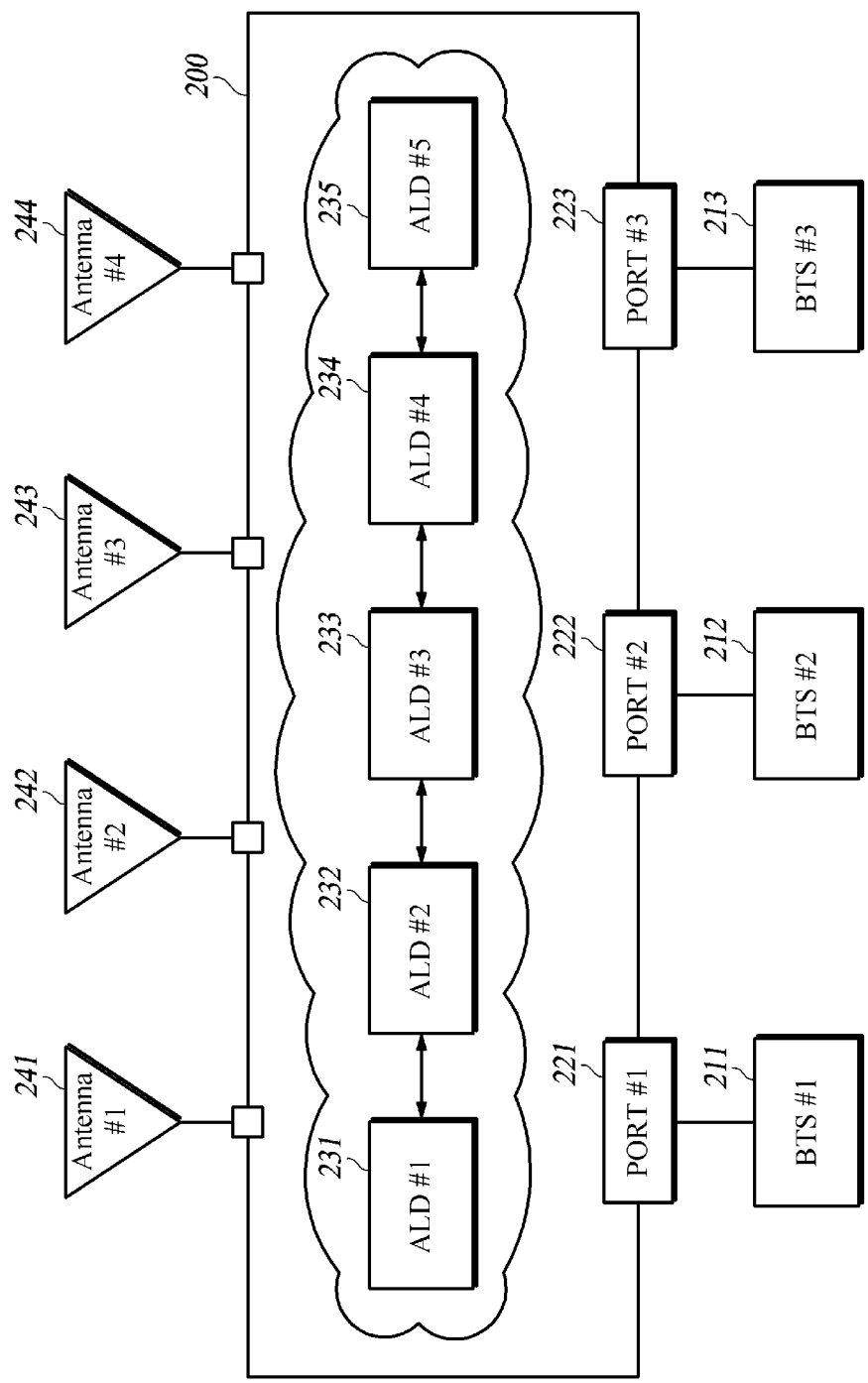
FIG. 2 is a conceptual diagram of a multi-ALD system according to at least one embodiment of the present disclosure.

FIG. 2 is a conceptual diagram of a multi-ALD system according to at least one embodiment of the present disclosure.

The base station system includes a plurality of base stations 211, 212 and 213 conforming to different communication standards and a plurality of antennas 241, 242, 243 and 244 of frequency bands used by the respective base stations.

A multi-ALD system 200 according to at least one embodiment of the present disclosure includes a plurality of base stations 211, 212 and 213, a plurality of ports 221, 222 and 223, a plurality of antennas 241, 242, 243 and 244, and a plurality of ALDs 231, 232, 233, 234 and 235 configured to control the plurality of antennas 241, 242, 243 and 244.

In the multi-ALD system 200, the ports are formed in the shape of a socket, a plug, or the like. The ports are linked with base stations by a feed cable, an Antenna Interface Standards Group (AISG) cable, or the like, and send and receive data to and from the base stations. The ALDs 231, 232, 233, 234 and 235 are linked with each other through a series or network of communication buses to communicate with each other.

In the conventional base station system shown in FIG. 1, the number of ports, the number of ALDs, and the number of antennas coincide with each other. However, in the multi-ALD system 200 according to at least one embodiment shown in FIG. 2, one ALD can control a plurality of antennas, and there is no particular limitation as to the number of ports, the number of ALDs, and the number of antennas. However, the number of base stations and the number of ports remain equal to each other.

In the multi-ALD system 200 according to at least one embodiment, a plurality of antennas can be controlled by one ALD. Preferably, the base stations transmit an antenna control command to the ALDs through the ports, and the antenna control command uses the RS-485 signal according to the AISG standard.

In the multi-ALD system 200, each base station can transmit an antenna control command to an ALD through a port. In addition, in the multi-ALD system 200, each base station may transmit a command configured to change interconnections between a plurality of ports and a plurality of ALDs or interconnections between a plurality of ALDs and the antennas to be controlled by the respective ALDs (hereinafter referred to as a "configuration command").

According to at least one embodiment, the configuration command means setting information indicating the interconnection between each port and each ALD, or the interconnection between each ALD and an antenna to be controlled by each ALD.

In the multi-ALD system 200, the relationship between a port, an ALD and an antenna may be changed by a configuration command. Such changeable interconnections are expressed in a cloud shape in FIG. 2.

When a plurality of configuration commands is executed at one time in the multi-ALD system 200, an error occurs in the configuration. Therefore, when one configuration command is being executed, another configuration command needs to be stopped from being executed. A plurality of ALDs are interconnected via a series or network of communication buses to communicate with each other, such that the configuration commands received from the base stations are shared and configuration commands are held from being executed other than one configuration command under execution.

Communications and control operations are performed in a plurality of ALDs as follows.

i) When a base station transmits a configuration command to a specific ALD, the ALD in receipt of the configuration command (hereinafter referred to as "master ALD") informs the other ALDs (hereinafter referred to as "slave ALDs") of reception of the configuration command through a communication bus.

ii) When the slave ALDs are informed of the reception of the configuration command from the master ALD, they transmit an acknowledge signal to the master ALD and ignore configuration commands received from the other base stations.

iii) The master ALD transmits a configuration command to the slave ALD that has transmitted the acknowledge signal.

iv) The master ALD and the respective slave ALDs reconfigure the interconnections between the ports and the ALDs or the interconnections between the ALDs and the antennas to be controlled by the ALDs according to the configuration command.

v) Upon completing the configuration of the interconnections according to the configuration command, each slave ALD informs the master ALD that the configuration operation according to the configuration command is completed.

vi) Once the master ALD completes the configuration operation according to the configuration command and is informed by all the slave ALDs that the configuration operation is completed, the master ALD transmits a configuration completion signal to the base station that has transmitted the configuration command and to all slave ALDs.

vii) The master ALD is allowed to execute a configuration command received from one of the base stations from the time at which the master ALD transmits the configuration completion signal. From the time of receiving the configuration completion signal, the slave ALDs are allowed to execute the configuration command received from one of the base stations.

In implementation of the multi-ALD system, it is unconstrained to set the ports to be connected by the respective ALDs and the antennas to be controlled by the respective ALDs. A full multi-ALD system refers to an antenna control system that has neither pre-set ports to be connected by the respective ALDs and nor pre-set antennas to be controlled by the respective ALDs, but is capable of freely setting the interconnections according to the configuration command.

However, it is advantageous in terms of reduction of manufacturing cost, simplification of design, prevention of a system error, and the like, to pre-set some of the interconnections. A half-multi-ALD system refers to an antenna control system that pre-sets some of the ports to be connected b the respective ALDs and some of the antennas to be controlled by the respective ALDs and is capable of freely setting the interconnections of the remaining ports and antennas.

Hereinafter, the present disclosure will be described by taking a half-multi-ALD system as an example.

Figure 3:
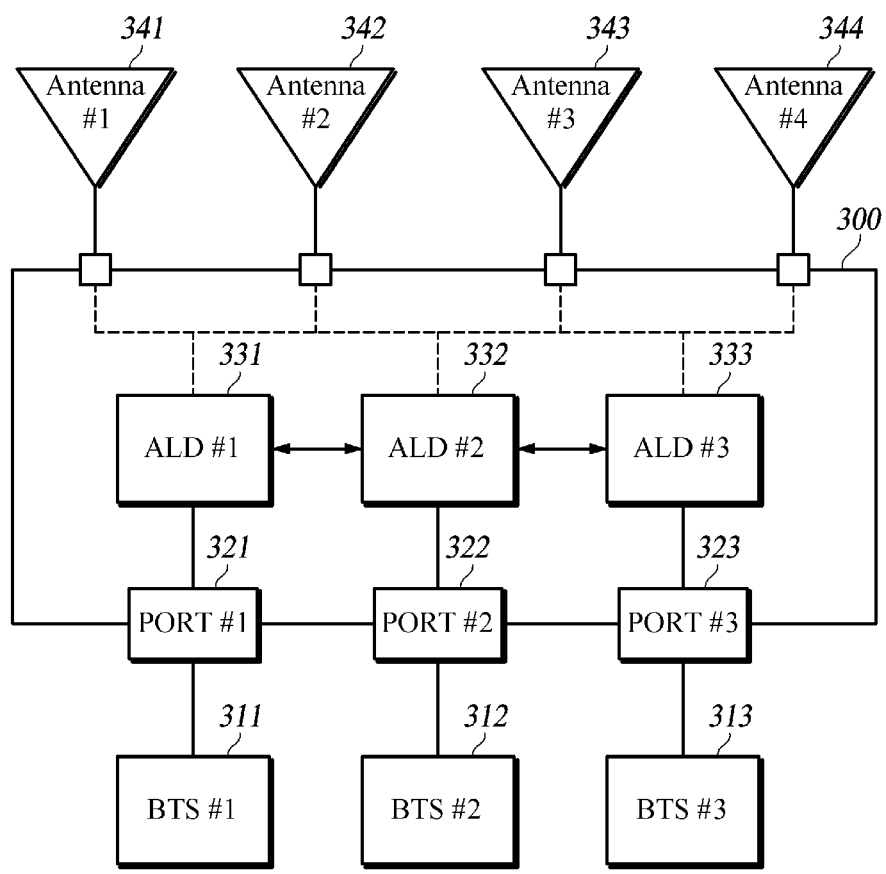
FIG. 3 is a diagram of a multi-ALD system according to a first embodiment, among others, of the present disclosure, wherein ports to be linked with respective ALDs are predesignated, and antennas to be controlled by the respective ALDs are flexibly set according to a configuration command.

FIG. 3 is a diagram of a multi-ALD system according to a first embodiment, among others, of the present disclosure, wherein ports to be connected to respective ALDs are predesignated, and antennas to be controlled by the respective ALDs are flexibly set according to a configuration command.

The multi-ALD system 300 according to the first embodiment includes a plurality of ports 221, 222 and 223 connected to a plurality of base stations, and a plurality of ALDs 231, 232 and 233 configured to control a plurality of antennas. In the multi-ALD system 300, the ports to be connected by the respective ALDs are predesignated, and the interconnections between the ALDs and the antennas may be reconfigured using a configuration command.

FIG. 4 is an exemplary diagram of a configuration command utilized by the multi-ALD system according to the first embodiment.

A user can input a configuration command using a keyboard, a mouse, a touchscreen, or the like. In the multi-ALD system according to the first embodiment, it is troubling when a configuration command input by the user indicates that a plurality of ALDs be connected to a single antenna.

In the case where a plurality of ALDs is connected to one antenna, conflicts may occur during an antenna control. For example, if a first ALD and a second ALD are connected to a first antenna, the first antenna may receive antenna control commands from the second ALD as well as the first ALD. If the first ALD issues a command to tilt the first antenna by 15 degrees and the second ALD issues a command to tilt the first antenna by 30 degrees, an abnormal operation will occur in tilting the antenna. Therefore, the configuration command needs to be programmed not to allow a plurality of ALDs to be connected to one antenna.

If a configuration command input by the user indicates that a plurality of ALDs be connected to one antenna, the multi-ALD system 300 outputs an error message and denies the configuration command.

The configuration command of FIG. 4 is a command indicating that a first antenna and a second antenna be connected to a first ALD, a third antenna be connected to a second ALD, and a fourth antenna to a third ALD. This configuration command is permitted because it does not indicate that a plurality of ALDs be connected to one antenna.

Figure 5:
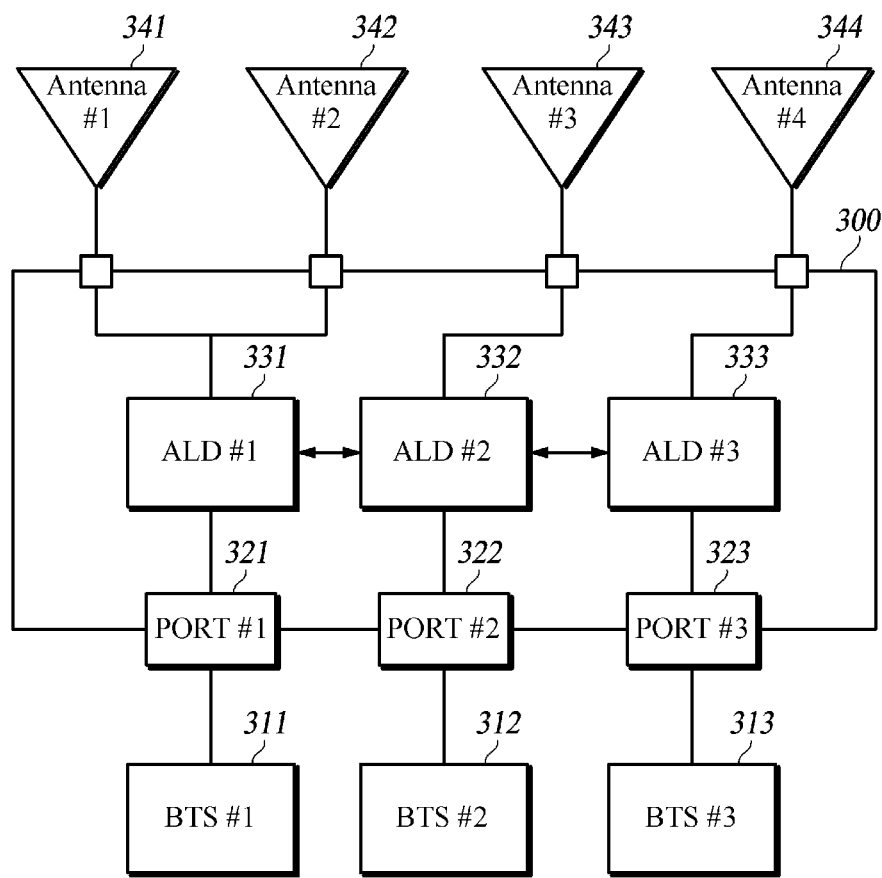
FIG. 5 is an exemplary diagram of a multi-ALD system having interconnections reconfigured according to the configuration command of FIG. 4.

FIG. 5 is an exemplary diagram of a multi-ALD system having interconnections reconfigured according to the configuration command of FIG. 4.

Referring to FIG. 5, it can be seen that the first antenna and the second antenna are connected to the first ALD, the third antenna is connected to the second ALD, and the fourth antenna is connected to the third ALD, according to the configuration command of FIG. 4.

Figure 6:
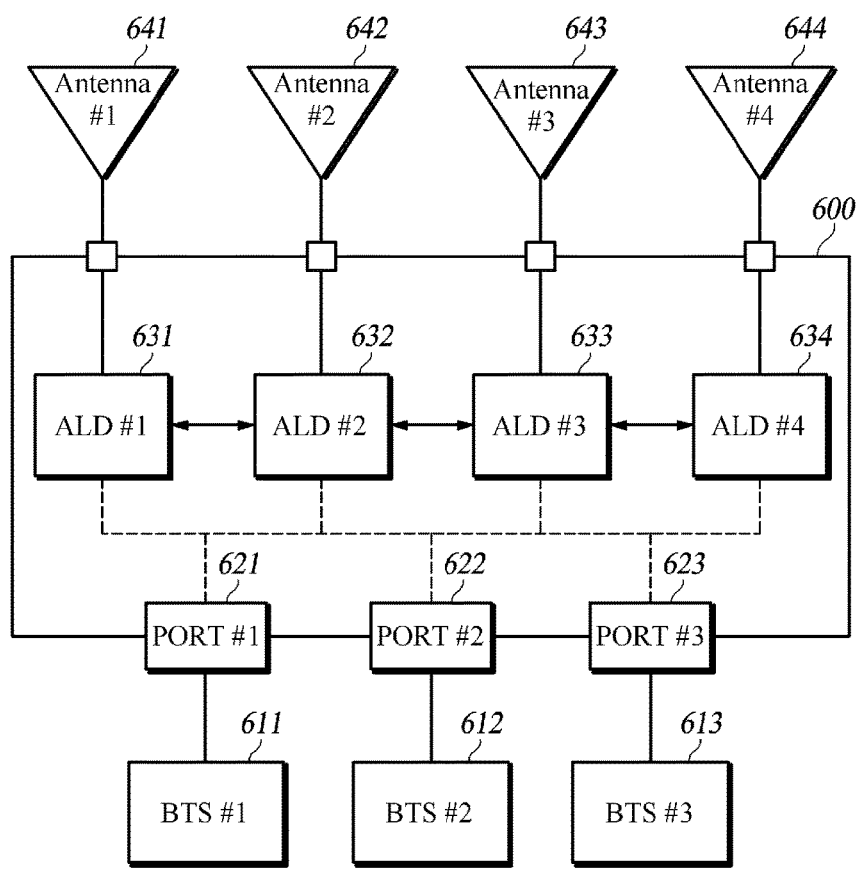
FIG. 6 is a diagram of a multi-ALD system according to a second embodiment, among others, of the present disclosure, wherein antennas to be controlled by respective ALDs are predesignated, and ports to be linked with the respective ALDs are flexibly set according to a configuration command.

FIG. 6 is a diagram of a multi-ALD system according to a second embodiment of the present disclosure, wherein antennas to be controlled by respective ALDs are predesignated, and ports to be connected to the respective ALDs are flexibly set according to a configuration command.

A multi-ALD system 600 according to the second embodiment includes a plurality of ports 621, 622 and 623 connected to a plurality of base stations, and a plurality of ALDs 631, 632, 633 and 634 configured to control a plurality of antennas. In the multi-ALD system 600 according to the second embodiment, antennas to be controlled by the respective ALDs are predesignated, and a configuration command may be used to reconfigure the interconnections between the ALDs and the ports.

FIG. 7 is an exemplary diagram of a configuration command according to the second embodiment.

The user can input a configuration command using a keyboard, a mouse, a touchscreen, or the like. In the multi-ALD system according to the second embodiment, it is troubling when a configuration command input by the user indicates that a plurality of ports be connected to a single ALD.

In the case where a plurality of ports is linked with one ALD, conflicts may occur during an antenna control. For example, if a first port and a second port are linked with a first ALD, the first ALD may receive antenna control commands from the second base station as well as the first base station. If the first base station indicates the first ALD to tilt a specific antenna by 15 degrees and the second base station indicates the first ALD to tilt the same antenna by 30 degrees, an abnormal operation will occur in tilting the antenna. Therefore, the configuration command needs to be programmed not to allow a plurality of ports to be linked with one ALD.

Exceptionally, if an R/W (Read/Write) and an R/O (Read Only) are considered in the configuration command, a configuration can be established in which a plurality of ports is linked with one ALD. The R/W and R/O of the configuration command are defined as follows.

1. Meaning of R/W in the Second Embodiment

The antenna control device controlled by the ALD may be a device such as a remote electrical tilt (RET) unit or a remote azimuth steering (RAS) unit that changes the state of the antenna using an electromagnet, a stepper motor, an actuator, a hydraulic device, and the like that are coupled to the antenna, where the interconnections between the ports and the ALDs are indicated by R/W. This operation is performed for the following reason.

The port transmits a command to change the state of the antenna to the ALD, which is indicated by W (Write) because this operation is performed in a manner of writing an antenna control command in the ALD.

When changing of the antenna state is completed, the ALD receives, from the antenna, state information including the changed tilt angle and azimuth of the antenna. This operation is indicated by R (Read) because the antenna state information is read from the ALD.

2. Meaning of R/O in the Second Embodiment

When the antenna control device is a device configured to sense the state of the antenna, such as an antenna temperature sensor (ATS) or a geographic location sensor (GLS), the interconnections between the ports and the ALDs are indicated by R/O. The port does not need to transmit a command to change the state of the antenna to the ALD, but only reads the antenna state information from the ALD, which is represented by R/O.

Even when the antenna control device controlled by the ALD is a device such as the RET and the RAS that changes the state of the antenna, it may only receive the state information such as the tilt angle and the azimuth of the antenna without changing the state of the antenna. This is indicated by R/O.

3. Method of Setting a Configuration Command in the Second Embodiment

When two or more ports are linked with one ALD in the R/W state in linking a plurality of ports to one ALD, two or more control commands to change the state of the antenna may conflict with each other. Therefore, such configuration is not allowed.

When only one port is connected to one ALD in the R/W state and the remaining ports are connected to the same in the R/O state in connecting a plurality of ports to the one ALD, no conflicts occur since only one control command indicates change of the state of the antenna and the other control commands merely request the state information on the antenna. Therefore, such configuration is allowed.

In the connection of a plurality of ports to one ALD, a configuration in which all ports are connected by R/O causes no conflicts. Therefore, such a configuration is allowed.

In case where a configuration command input by a user indicates that a plurality of ports be connected to one ALD, if two or more ports are connected to one ALD in the R/W state, the multi-ALD system 600 outputs an error message and denies the configuration command. However, two or more ports are allowed to be connect to one ALD in the R/O state.

The configuration command of FIG. 7 is configured to indicate that the first port be connected to the first ALD in the R/W state, the second port to the second ALD in the R/W state, and the third port to the second ALD in the R/O state, the first port to the third ALD in the R/O state, the second port to the third ALD in the R/W state, and the third port to the fourth ALD in the R/W state. Since the configuration command of FIG. 7 does not include a configuration in which two or more ports are connected to one ALD in the R/W state, the configuration command of FIG. 7 is allowed.

Figure 8:
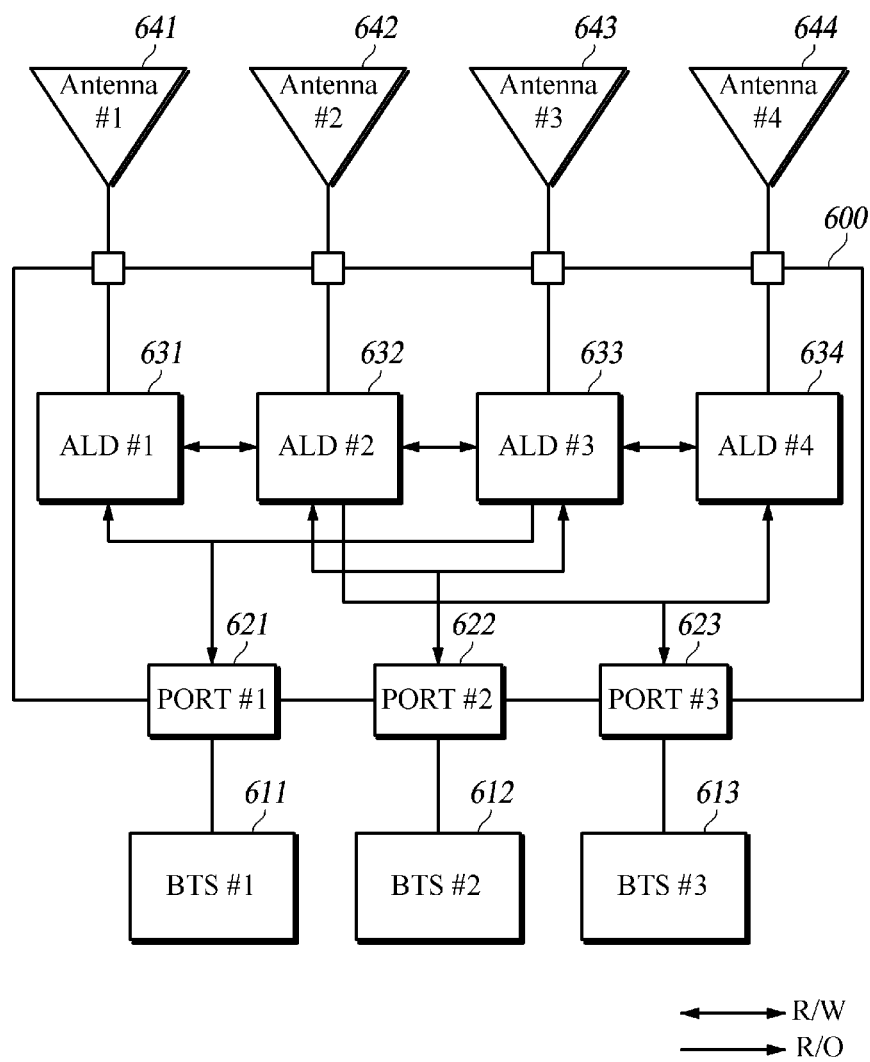
FIG. 8 is an exemplary diagram of a multi-ALD system having interconnections reconfigured according to the configuration command of FIG. 7.

FIG. 8 is an exemplary diagram of a multi-ALD system having interconnections reconfigured according to the configuration command of FIG. 7.

In expressing the interconnections between ALDs and ports, the R/W connection is represented by a bidirectional arrow and the R/O connection is represented by a unidirectional arrow. In the case of R/W, the antenna control command is transmitted from a port to an ALD, the ALD controls the antenna according to the control command, and then receives state information about the antenna and relays the same to the port. Therefore, communication is bidirectionally performed. On the other hand, in the case of R/O, the ALD receives and transfers the state information about the antenna to the port, and thereby ends the communication. Therefore, communication is performed unidirectionally.

Referring to FIG. 8, it can be seen that the first port is connected to the first ALD in the R/W state, the second port is connected to the second ALD in the R/W state, and the third port is connected to the second ALD in the R/O state, the first port is connected to the third ALD in the R/O state, the second port is connected to the third ALD in the R/W state, and the third port is connected to the fourth ALD in the R/W state.

Figure 9:
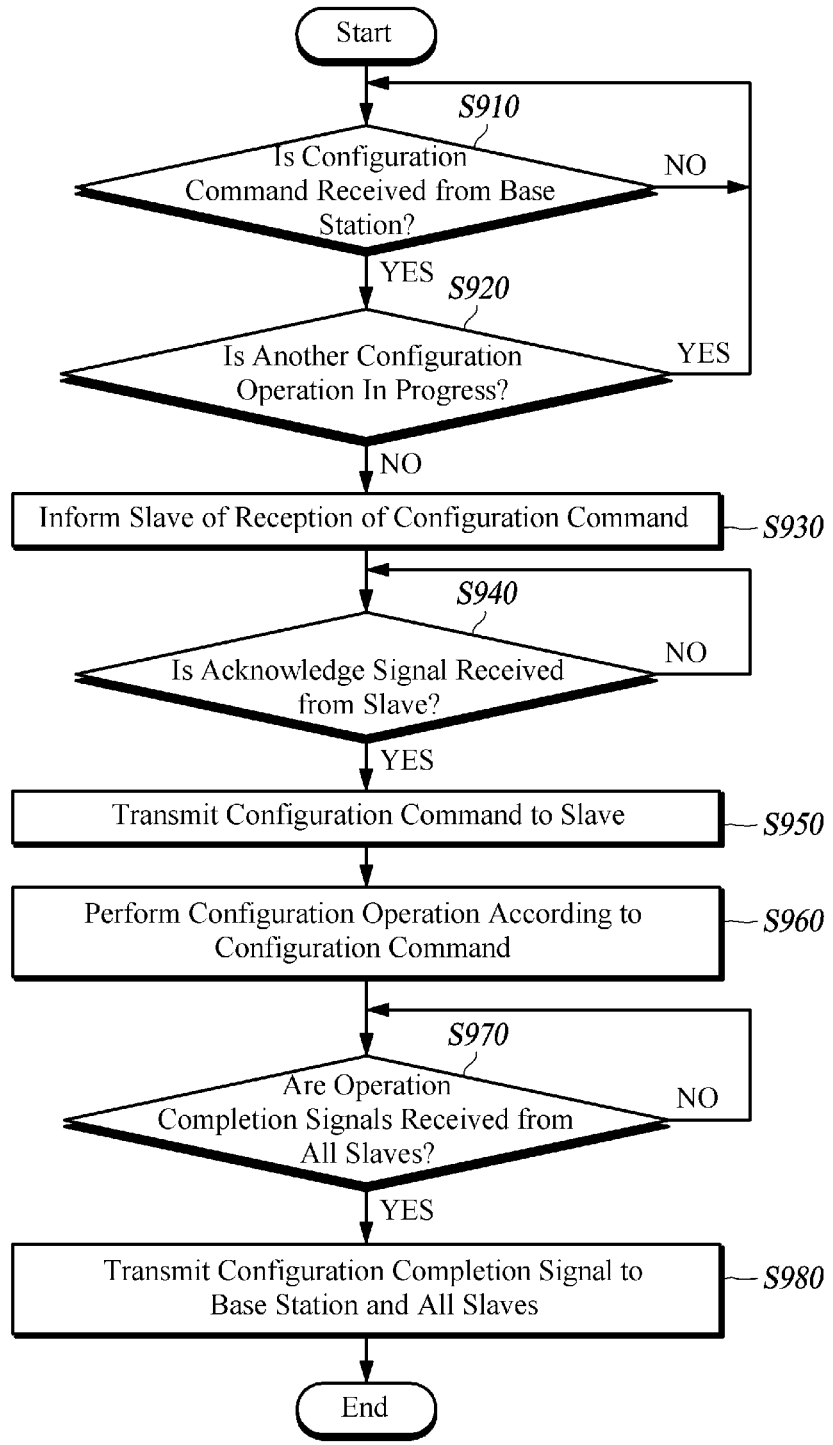
FIG. 9 is an exemplary flowchart of a configuration method of an antenna control system, according to at least one embodiment from the point of view of a master ALD.

FIG. 9 is an exemplary flowchart of a configuration method of an antenna control system using a multi-ALD system according to at least one embodiment from the point of view of a master ALD.

The configuration method of an antenna control system using a multi-ALD system illustrated from the point of view of a master ALD includes a configuration command reception step (S910), a progress determination step (S920), an informing step (S930), an acknowledge signal reception step (S940), a configuration command transmission step (S950), a configuration operation step (S960), an operation completion signal reception step (S970), and a configuration completion signal transmission step (S980).

The configuration command reception step (S910) is a step in which an ALD receives a configuration command from one of the base stations through a port. The ALD that receives the configuration command from the port becomes the master ALD and supervises execution of the configuration command.

The progress determination step (S920) is a step in which the master ALD determines whether or not a configuration operation by another configuration command is in progress. In this step, if the configuration operation by another configuration command is in progress (YES in S920), the master ALD denies the configuration command transmitted from the port. If the configuration operation by another configuration command is not in progress (NO in S920), the master ALD informs the slave ALDs of a reception of the configuration command (S930).

In the acknowledge signal reception step (S940), if the master ALD receives, from a slave ALD, a signal confirming that the slave ALD has been informed that the configuration command has been received (Yes in S940), the master ALD transmits a configuration command to the slave ALD (S950).

The configuration operation step (S960) is a step in which the master ALD performs a configuration operation according to the configuration command.

In the operation completion signal reception step (S970), when the master ALD completes the configuration operation according to the configuration command and receives an operation completion signal from all the slave ALDs (Yes in S970), the master ALD transmits a configuration completion signal to the base station through the port, and transmits a configuration completion signal to all the slave ALDs (S980).

Steps S910 to S980 are described to be sequentially performed in FIG. 9 as a mere example for describing the technical idea of some embodiments, although one of ordinary skill in the pertinent art would appreciate that various modifications, additions and substitutions are possible by performing the sequences shown in FIG. 9 in a different order or at least one of steps S910 to S980 in parallel without departing from the idea and scope of the embodiments, and hence the example shown in FIG. 9 is not limited to the chronological order.

The steps shown in FIG. 9 can be implemented as a computer program, and can be recorded on a non-transitory computer-readable medium. The computer-readable recording medium includes any type of recording devices on which data that can be read by a computer system are recordable. Examples of the computer-readable recording medium include a magnetic storage medium (e.g., a floppy disk, a hard disk, a ROM, a USB memory, etc.), an optically readable medium (e.g., a CD-ROM, DVD, Blue-ray, etc.) and carrier waves (e.g., transmission through the Internet). Further, an example computer-readable recording medium has computer-readable codes that can be stored and executed in a distributed manner in computer systems connected over a network.

Figure 10:
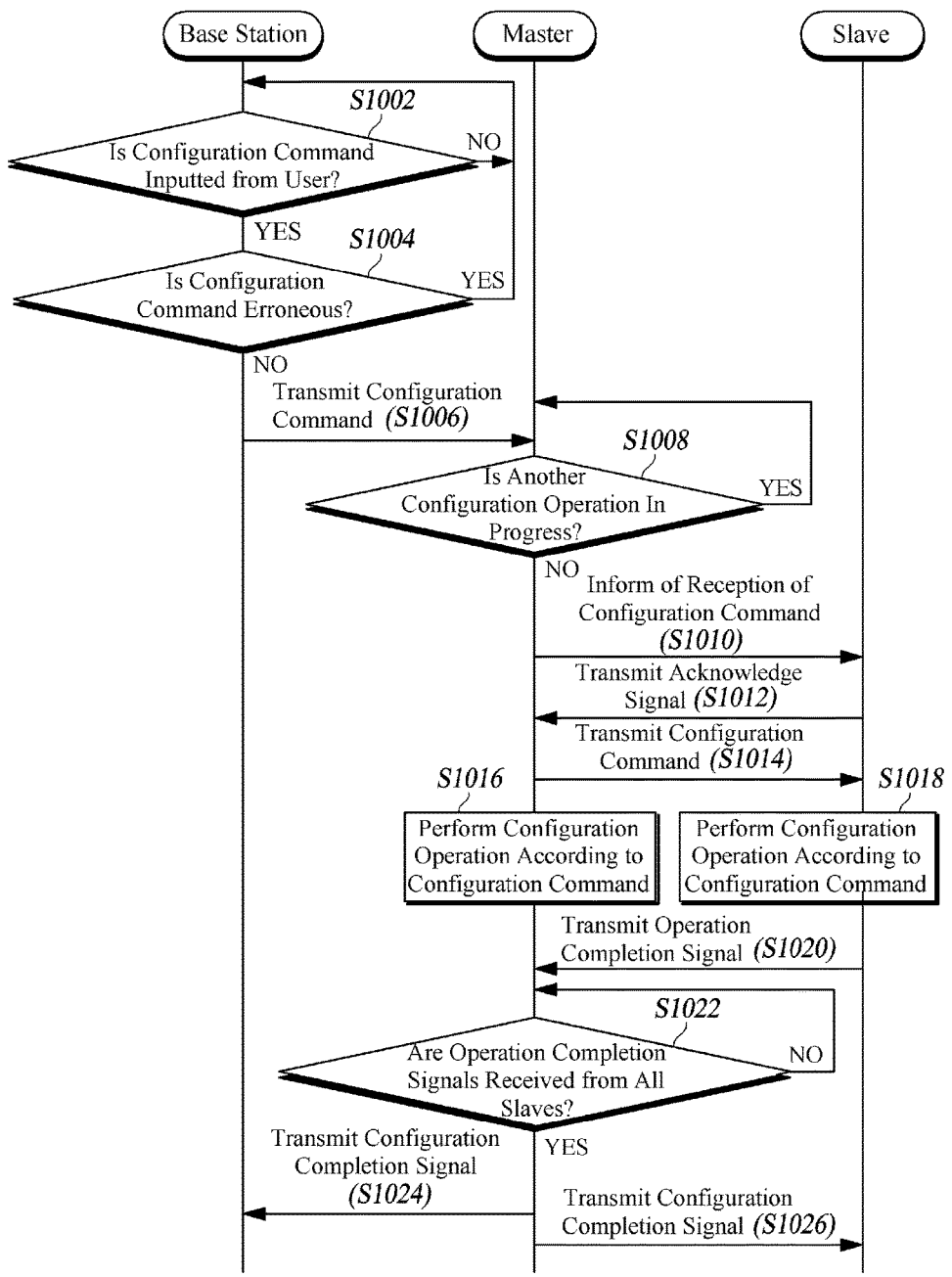
FIG. 10 is an exemplary flowchart of a configuration method of an antenna control system, according to at least one embodiment from the point of view of a base station, a port, a master ALD and a slave ALD.

FIG. 10 is an exemplary flowchart of a configuration method of an antenna control system, according to at least one embodiment from the point of view of a base station, a master ALD and a slave ALD.

When receiving a configuration command from the user (YES in S1002), the base station determines whether the configuration command is erroneous (S1004). If the configuration command is configured such that a plurality of ALDs is connected to one antenna or two or more ports are connected to one ALD in the R/W state, the base station determines that the configuration command is erroneous.

If the configuration command is not erroneous (NO in S1004), the base station transmits the configuration command to the ALD through the port (S1006). If the configuration command is erroneous (YES in S1004), the base station again receives the configuration command from the user.

The master ALD determines whether or not a configuration operation by another configuration command is in progress. If a configuration operation is in progress by another configuration command (YES in S1008), the master ALD denies the configuration command transmitted from the port. Unless a configuration operation is in progress by another configuration command (NO in S1008), the master ALD informs the slave ALD of a receipt of the configuration command (S1010).

When the slave ALD is informed of the receipt of the configuration command from the master ALD, the slave ALD transmits an acknowledgement signal to the master ALD (S1012). The slave ALD denies any new configuration command from the time when the slave ALD is informed of the receipt of the configuration command even if it receives a new configuration command through the port.

Upon receiving the acknowledgement signal from the slave ALD, the master ALD transmits a configuration command to the slave ALD that has transmitted the acknowledgement signal (S1014).

The master ALD and the slave ALD respectively perform a configuration operation according to the configuration command (S1016, S1018).

When the configuration operation according to the configuration command is completed, the slave ALD transmits an operation completion signal to the master ALD (S1020).

The master ALD autonomically completes the configuration operation according to the configuration command. Upon receiving operation completion signals from all the slave ALDs (YES in S1022), the master ALD transmits a configuration completion signal to the base station and all the slave ALDs (S1024, S1026). At this time, the master ALD may transmit the configuration completion signal to the base station first or may transmit the configuration completion signal to the slave ALDs first. That is, the order of S1024 and S1026 may be reversed.

When the base station receives the configuration completion signal through the port (S1024), the configuration operation is terminated.

Although exemplary embodiments of the present disclosure have been described for illustrative purposes, those skilled in the art will appreciate that various modifications, additions and substitutions are possible, without departing from the idea and scope of the claimed invention.

Exemplary embodiments of the present disclosure have been described for the sake of brevity and clarity. Accordingly, one of ordinary skill would understand the scope of the disclosure is not limited by the explicitly described above embodiments but is inclusive of the claims and equivalents thereof.

What is claimed is:

1. A method of controlling a plurality of antennas in a multi-ALD (Antenna Line Device) system including a plurality of ALDs and a plurality of ports linked with a plurality of base stations, the method comprising:
   receiving a configuration command by a master ALD among the plurality of ALDs from a base station of the plurality of base stations;
   transferring the configuration command by the master ALD to other ALDs directly through communication buses between the master ALD and the other ALDs; and
   changing configuration of the multi-ALD (Antenna Line Device) system based on the configuration command from a first configuration to a second configuration, wherein in the first configuration, a first antenna among the plurality antennas is controlled by a first ALD among the plurality of ALDs, and in the second configuration, the first antenna is controlled by a second ALD among the plurality of ALDs, the second ALD being different from the first ALD,
   wherein the configuration command comprises configuration information indicating updated interconnections between the plurality of ALDs and the plurality of antennas.

2. The method of claim 1, wherein the multi-ALD system predesignates the antenna to be controlled by said each of the plurality of ALDs.

3. The method of claim 2, wherein the configuration information indicates updated interconnections between the plurality of ALDs and the plurality of ports so that a single ALD is not allowed to receive and execute commands to change an antenna state from two or more of the ports.

4. The method of claim 1, wherein the multi-ALD system predesignates a port to be linked to said each of the plurality of ALDs, and wherein the configuration command indicates each antenna to be controlled by said each of the plurality of ALDs.

5. The method of claim 4, wherein the configuration information indicates interconnections between the plurality of ALDs and the plurality of antennas so that a single ALD is not linked to two or more of the antennas.

6. The method of claim 1, further comprising, upon completion of configuration of the plurality of ALDs according to the configuration command, transmitting a configuration completion signal by the master ALD to all of the base station and other ALDs which received the configuration command from the master ALD.

7. The method of claim 1, wherein the transferring comprises:
   transmitting, by the master ALD to at least one of the other ALDs, an acknowledgement signal to inform the other ALDs of the receipt of the configuration command;
   receiving, by the master ALD from the at least one of the other ALDs, a confirmation signal to confirm receipt of the acknowledgement signal; and
   transmitting, by the master ALD to the at least one of the other ALDs, the configuration command.

8. The method of claim 7, wherein the at least one of the other ALDs disregards another configuration command received from any of the plurality of base stations from when the acknowledgement signal is received until a configuration completion signal is received from the master ALD.

9. A multi-ALD (Antenna Line Device) system for controlling a plurality of antennas, the multi-ALD system comprising:
   a plurality of ports configured to be linked to a plurality of base stations, respectively; and
   a plurality of ALDs, comprising a master ALD and other ALDs, configured to control the plurality of antennas, wherein the master ALD is configured to directly communicate with other ALDs through communication buses between the master ALD and the other ALDs,
   wherein each of the plurality of ALDs is linked to one of the plurality of ports for communication with each other, and configuration of the multi-ALD system is changed such that an antenna is controlled or a port is linked to one of the plurality of ALDs according to a configuration command received by the master ALD from one of the plurality of base stations from a first configuration to a second configuration, wherein in the first configuration, a first antenna among the plurality antennas is controlled by a first ALD among the plurality of ALDs, and in the second configuration, the first antenna is controlled by a second ALD among the plurality of ALDs, the second ALD being different from the first ALD,
   wherein the configuration command comprises:
   configuration information indicating updated interconnections between the plurality of ALDs and the plurality of antennas.

10. The multi-ALD system of claim 9, wherein, upon receiving the configuration command, the master ALD transfers the configuration command to the other ALDs such that the plurality of ALDs share the configuration command.

11. The multi-ALD system of claim 9, wherein at least one of the other ALDs disregards another configuration command received from any of the plurality of base stations while a configuration operation is in progress according to the configuration command.

12. The multi-ALD system of claim 11, wherein the configuration command comprises:
   configuration information for setting the interconnections so that a single ALD is not allowed to receive and execute commands to change an antenna state from two or more of the ports.

13. The multi-ALD system of claim 11, wherein the configuration command comprises:
   configuration information for setting the interconnections so that a single ALD is not linked to two or more of the antennas.

14. The multi-ALD system of claim 9, wherein the multi-ALD system predesignates an antenna to be controlled by said each of the plurality of ALDs, and wherein the configuration command indicates each port to be linked to said each of the plurality of ALDs.

15. The multi-ALD system of claim 9, wherein the multi-ALD system predesignates a port to be linked to said each of the plurality of ALDs, and wherein the configuration command indicates each antenna to be controlled by said each of the plurality of ALDs.

16. An ALD (Antenna Line Device) operable in a multi-ALD system for controlling a plurality of antennas, the multi-ALD system being configured to operate in a plurality of configurations, wherein the multi-ALD system comprises:
   a plurality of ALDs, including the ALD, each being configured to control one or more of the plurality of antennas, the plurality of ALDs being configured to directly communicate with each other through communication buses; and a plurality of base stations each being associated with at least one of the plurality of ALDs according to a configuration of the multi-ALD system, wherein another ALD is associated with a first base station and controls a first antenna of the plurality of antennas in a first configuration, and the another ALD is associated with a second base station and controls a second antenna of the plurality of antennas in a second configuration, wherein the ALD is configured to:
  receive a first message from one of the plurality of base stations while in the first configuration, the first message instructing the ALD to change the configuration of the multi-ALD system, and
  transmit a second message to the another ALD in response to reception of the first message, wherein the second message comprises first set of information which instructs the another ALD to be associated with the second base station or instructs the another ALD to control the second antenna.

17. The ALD of claim 16, wherein the ALD is further configured to transmit the first message to all other ALDs, including the another ALD but excluding the ALD.

18. The ALD of claim 16, wherein the first set of information instructs the another ALD to control multiple antennas, including the second antenna.

19. The ALD of claim 16, wherein the ALD is further configured to:
  transmit a notification message to the another ALD which notifies the another ALD of the receipt of the first message.

20. The ALD of claim 19, wherein the ALD is further configured to:
  receive a confirmation message from the another ALD which confirms receipt of the notification message.

* * * * *